Nov. 11, 1941. J L. GIBSON Re. 21,941

REFRIGERATING APPARATUS

Original Filed Sept. 30, 1930 2 Sheets-Sheet 1

INVENTOR.
J LOWELL GIBSON.

BY
Spencer, Hardman and Fehr.

Nov. 11, 1941. J L. GIBSON Re. 21,941

REFRIGERATING APPARATUS

Original Filed Sept. 30, 1930 2 Sheets-Sheet 2

INVENTOR.
J LOWELL GIBSON.

BY

Spencer, Hardman and Fehr

Reissued Nov. 11, 1941

Re. 21,941

UNITED STATES PATENT OFFICE 21,941

REFRIGERATING APPARATUS

J Lowell Gibson, Dayton, Ohio, assignor, by mesne assignments, to General Motors Corporation, a corporation of Delaware Original No. 2,073,741, dated March 16, 1937, Serial No. 485,446, September 30, 1930. Reissue No. 21,040, dated April 4, 1939, Serial No. 255,693, February 10, 1939. This application for reissue September 8, 1941, Serial No. 410,118

9 Claims. (Cl. 62—116)

This invention relates to refrigerating apparatus and more particularly to refrigerating apparatus utilizing a plurality of refrigerant circuits.

One of the objects of the present invention is to provide an improved refrigerating apparatus which prevents dehydration of food by the uniform cooling of a food compartment at a relatively high refrigerating temperature, and which at the same time provides a freezing compartment maintained at a relatively low temperature.

It is a further object to enable the accomplishment of the foregoing object and have a wide variation of temperatures between the freezing and food compartments.

Further objects and advantages of the present invention will be apparent from the following description, reference being had to the accompanying drawings, wherein a preferred form of the present invention is clearly shown.

Figures 1, 2:
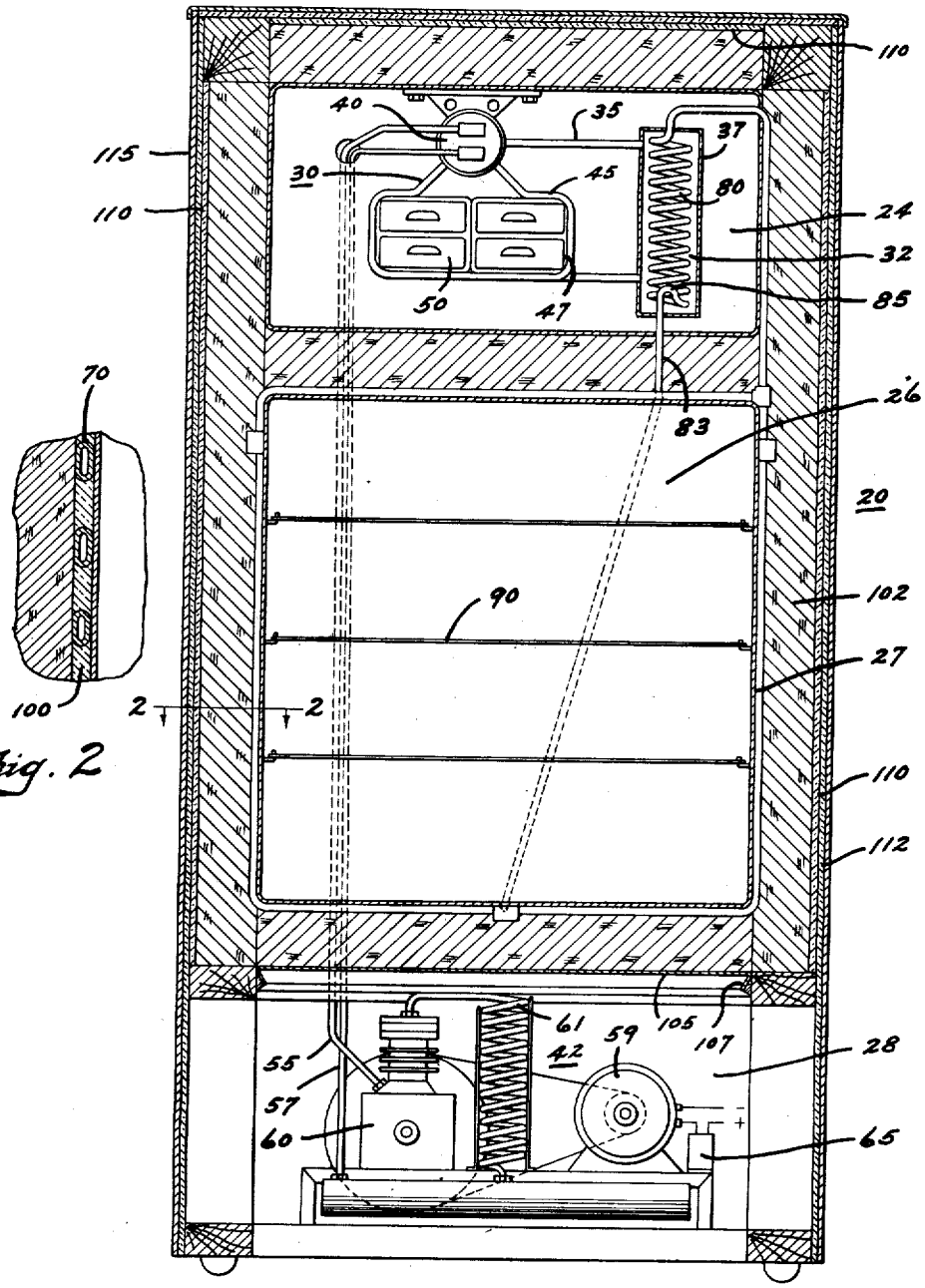
Fig. 1 is a vertical view in cross-section of a refrigerating apparatus embodying features of the invention.
Fig. 2 is a fragmentary view taken in the direction of the arrows 2—2 of Fig. 1.

Referring to the drawings, the numeral 20 designates, in general, a refrigerating apparatus embodying features of the present invention. The apparatus 20 comprises, in general, a cabinet 22 comprising a freezing compartment 24, a food compartment 26, formed by an inner metal lining 27, and a machinery compartment 28. The apparatus 20 also includes a primary refrigerating system 30 for maintaining a relatively low temperature such as for freezing, and a secondary refrigerating system 32 for the maintenance of a higher refrigerating temperature such as is suitable for refrigerating food articles stored in the food compartment 26. Thermal heat exchange means 35 between the primary and secondary systems is provided. The heat exchange means 35 provides a shell 37 containing the heat exchange elements.

Referring more in detail to the drawings, the primary refrigerating system comprises, in general, a liquid refrigerant evaporator 40 of the flooded, float controlled type, for instance, as shown in the patent to R. G. Osborn, No. 1,556,-708, issued October 13, 1925, and a refrigerant liquefying unit 42. The evaporator 40 is located in the freezing compartment 24 and is provided with one or more depending loops 45 which forms a freezing zone 47 adapted to house a plurality of ice-making receptacles 50. One or more of the loops 45 may be connected to the shell 37 to provide a closed refrigerant circuit through the shell 37. The liquefying unit 42 withdraws the gaseous refrigerant from the evaporator 40 through a vapor conduit 55, liquefies the refrigerant and delivers it to a supply conduit 57. The liquefying unit is located in the machinery compartment and includes a motor 59, compressor 60 and condenser 61, the motor being controlled in response to pressure within the conduit 55 and therefore in accordance with the temperature of the body of liquid refrigerant in evaporator 40, by means of an automatic switch 65 which connects the motor with the power mains, to maintain, normally, the said temperature within predetermined limits.

Figure 3:
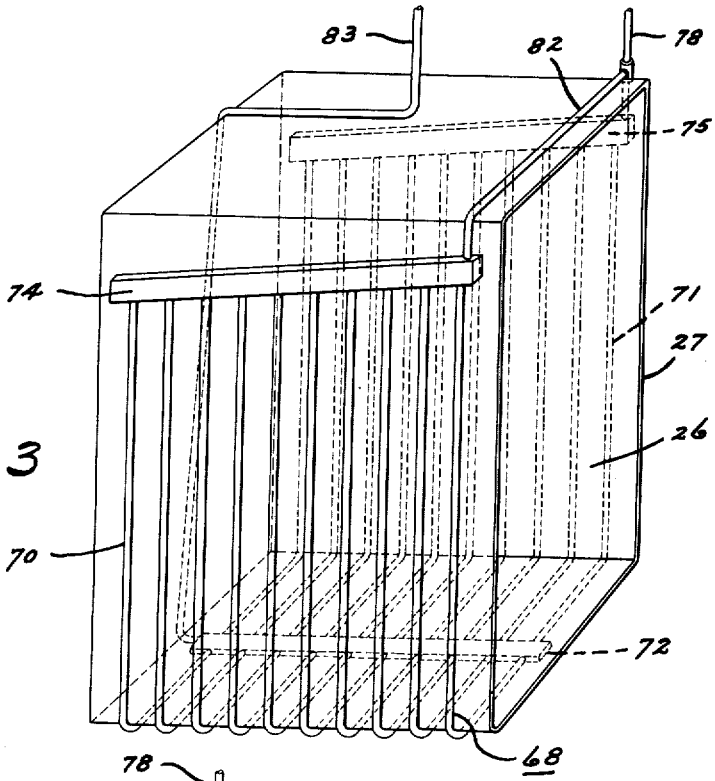
Fig. 3 is a perspective view of a portion of the apparatus shown in Fig. 1.
Figure 4:
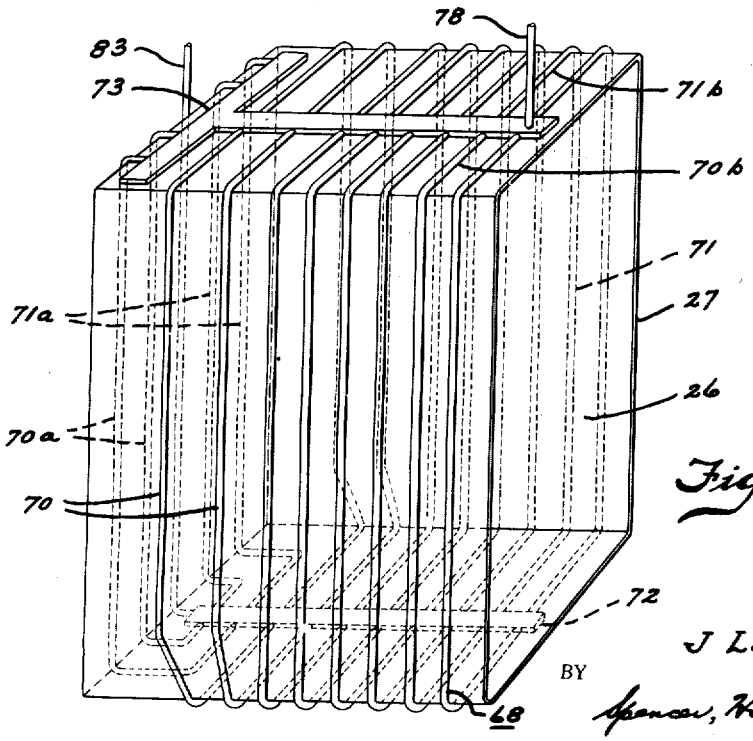
Fig. 4 is a perspective view similar to Fig. 3 and showing a modified form of a portion of the apparatus shown in Fig. 1.

The secondary refrigerating system 32 comprises in general, a liquid refrigerant evaporator 68 formed preferably by a plurality of flattened tubes 70 and 71. The tubes 70 and 71 are joined at their lower ends by a liquid refrigerant manifold 72 and at their upper ends by exhaust manifolds 74 and 75 respectively (see Fig. 3). Preferably the flattened tubes and manifolds are sweated to the inner metal lining which forms the food compartment 26. The evaporator substantially surrounds the food compartment lining member by extending the tubes 70 and 71 around the bottom and side walls thereof. Obviously the tubes 70 and 71 could be extended over the top and rear walls of the lining if desired. As an example I refer to Fig. 4 wherein tubes 70 and 71 extend over the back wall of lining 27 as at 70*a* and 71*a* and over the top wall thereof as at 70*b* and 71*b*. The upper ends of tubes 70 and 71 communicate with a substantially T-shaped manifold 73 provided along the top wall of lining 27. The exhaust manifolds 73 and 75 are provided with a conduit 78 which leads to a coiled pipe 80 forming the condenser within the shell 37. The manifold 74 is provided with a conduit 82 which is connected with pipe 78. The manifold 72 is provided with a conduit 83 which leads to the lower portion of the coiled pipe 80 and is provided with an upwardly directed bent portion 85 which provides a liquid refrigerant trap at the bottom of the coil 80.

The secondary refrigerating system is adapted for cooling food articles placed on shelves 90 in the food compartment 26. Since the evaporator which includes the loops 70 and 71 extends substantially around the inner metal lining member 27 it will be noted that the compartment 26 is uniformly cooled by such arrangement to thus prevent the dehydration of foods stored therein. The operation of the secondary refrigerating system is as follows: As the temperature in the food compartment 26 increases, the liquid refrigerant in the evaporator portion formed by the loops 70 and 71 vaporizes and rises to the manifolds 74 and 75 or to the manifold 73 whence the gas passes through the conduits 82 and 78 or through conduit 78 extending upwardly from the manifold 73 to the coiled pipe 80 wherein it is liquefied by means of the cooling action of the primary refrigerant in the shell 37. The liquid refrigerant in the coiled pipe 80 is discharged through pipe 83 into the liquid refrigerant manifold 72 which feeds the liquid refrigerant to the evaporator loops 70 and 71.

In order to properly insulate the refrigerating apparatus in the cabinet 22, a coating of bituminous cement, such as, hydrolene 100 is poured between the conduits 70 as shown in Fig. 2. Slabs of insulation 102, such as, rock cork are then applied to the side walls, top wall, between the freezing compartment and food compartment and bottom wall of the food compartment. The insulation at the bottom wall of the food compartment is held in place by a retaining member 105 having outwardly directed flanges 107 which permits the joint between the flange 107 and the cabinet frame to be sealed by hydrolene. As shown in Fig. 1, the insulated top and side walls of the cabinet are hermetically sealed with hydrolene as at 110. Insulation 112, such as, cardboard is then applied to the hydrolene 110. The insulation of the cabinet is held in place by an outer metal casing 115. By this arrangement the transfer of heat from the exterior to the interior of the cabinet is greatly reduced since the breathing action is lessened.

Preferably a volatile liquid refrigerant is provided in the secondary refrigerating system, such as, halogen derivative of an aliphatic hydrocarbon, and, for instance, dichloro-difluoro methane.

Preferably the temperature in the freezing zone 47 is maintained between predetermined temperature limits by the action of the refrigerant liquefying unit 42 for freezing substances in the receptacles 57. The temperature in the evaporator of the secondary refrigerating system is maintained between predetermined limits for refrigerating food articles in the compartment 26 by providing temperature differential producing means between the evaporator 68 and the condenser 80. In order to control this temperature differential a quantity of gas such as air, noncondensable at temperatures prevailing in the secondary system may be injected into said secondary system.

While the form of embodiment of the present invention as herein disclosed, constitutes a preferred form, it is to be understood that other forms might be adopted, all coming within the scope of the claims which follow.

What is claimed is as follows:

1. Refrigerating apparatus comprising in combination a cabinet having a freezing compartment and a food compartment, said food compartment being provided with an inner metal lining, insulation between said compartments, a primary refrigerating system providing a freezing zone in said freezing compartment, a secondary refrigerating system comprising a cooling member substantially surrounding said inner metal lining and in thermal contact therewith, said secondary system being provided with a gas non-condensable at temperatures prevailing in the secondary system, and heat exchange means for said systems.

2. Refrigerating apparatus comprising in combination a cabinet having a freezing compartment and a food compartment, said food compartment being formed by an inner metal lining, insulation between said compartments, a primary refrigerating system for cooling said freezing compartment, said primary refrigerating system comprising a liquid refrigerant evaporator provided with a plurality of depending ducts forming a freezing zone, and a refrigerant liquefying unit for supplying refrigerant to said evaporator, a secondary refrigerating system comprising a liquid refrigerant evaporator including a liquid refrigerant manifold and exhaust manifolds and a plurality of conduits interconnecting said manifolds, said conduits being secured to opposed walls of said lining member and extending across the bottom wall of said lining member, heat exchange means for said systems, said heat exchange means including a condenser for said secondary system, said condenser including a coiled conduit provided with a liquid refrigerant trap at the lower portion thereof, said coiled conduit being connected with said evaporator of the secondary system.

3. Refrigerating apparatus comprising in combination, a cabinet having a freezing compartment and a food compartment located below said freezing compartment, said food compartment being formed by an inner metal lining, insulation between said compartments, a primary refrigerating system for cooling said freezing compartment, said primary refrigerating system comprising a liquid refrigerant evaporator provided with a plurality of depending ducts forming a freezing zone, and a refrigerant liquefying unit for supplying refrigerant to said evaporator, a secondary refrigerating system comprising a liquid refrigerant evaporator including a liquid refrigerant manifold and exhaust manifolds and a plurality of conduits interconnecting said manifolds, said conduits being secured to opposed walls of said lining member in parallel relation and extending across the bottom wall of said lining member, said secondary system being provided with a gas non-condensable at temperatures prevailing in the secondary system, heat exchange means for said systems, said heat exchange means including a condenser for said secondary system, said condenser including a coiled conduit provided with a liquid refrigerant trap at the lower portion thereof, said coiled conduit being connected with said manifolds of the evaporator of the secondary system.

4. Refrigerating apparatus comprising in combination, a cabinet having a freezing compartment and a food compartment, said food compartment having an inner lining, insulation between said compartments, a primary refrigerating system providing a freezing zone in said freezing compartment, a secondary refrigerating system comprising a cooling member disposed in thermal contact with said inner lining and substantially surrounding same, heat exchange means for said systems, said secondary refrigerating system having a volatile refrigerant therein, and means for maintaining a predetermined differential in the temperature of refrigerant in the primary system and refrigerant in the cooling member of the secondary system.

5. Refrigerating apparatus including a plurality of vertically extending insulating walls forming an enclosure coextensive in width and depth substantially throughout the height thereof, an imperforate partition element extending horizontally between said vertical walls and dividing said enclosure into upper and lower food storage compartments, said compartments being substantially coextensive in width and depth, an evaporator located within one of said compartments, said evaporator having a portion thereof disposed for the making of ice, and another portion thereof for directly cooling air within said one compartment, a second evaporator in heat exchange relation with said second compartment, a condenser connected to said second named evaporator, said condenser being arranged in direct contact with a portion of said first named evaporator.

6. Refrigerating apparatus including a plurality of vertically extending insulating walls forming an enclosure coextensive in width and depth substantially throughout the height thereof, an imperforate partition element extending horizontally between said walls and dividing said enclosure into upper and lower food storage compartments, said compartments being substantially coextensive in width and depth, an evaporator located within one of said compartments, said evaporator having an ice making portion and a portion in direct contact with air within said one compartment, a metallic lining for the other of said compartments, an evaporator in contact with said liner, a condenser connected to said second evaporator, said condenser being located in direct contact with said first named evaporator.

7. Refrigerating apparatus including a cabinet having three compartments formed therein, a motor and compressor located in one of said compartments, said other compartments being provided with insulating walls and being arranged substantially coextensive in width and depth throughout their height, an evaporator for one of said insulated compartments, said evaporator having a portion thereof for the manufacture of ice and another portion thereof disposed in direct contact with air within said compartment, a metallic liner for the second compartment, an evaporator located in direct contact with the exterior surface of said liner, a condenser connected to said second named evaporator, said condenser being located in direct contact with a portion of said first named evaporator.

8. Refrigerating apparatus including a cabinet having three compartments formed therein, a high pressure side including a motor and compressor located in one of said compartments, said other compartments being insulated and separated from each other by a partition, said last two compartments being arranged substantially coextensive in width and depth throughout their height, a low pressure side including an evaporator in heat exchange relation with one of said insulated compartments for the manufacture of ice and for the cooling of air within said compartment, a metallic liner for the other insulated compartment, an evaporator located in direct contact with the exterior surface of three upright side walls and the bottom wall of said liner, and a condenser connected to said second named evaporator, said condenser being located in direct contact with a portion of said low pressure side.

9. Refrigerating apparatus including a cabinet having three compartments formed therein, a high pressure side including a motor and compressor located in one of said compartments, said other compartments being insulated and separated from each other by a partition, said last two compartments being arranged substantially coextensive in width and depth throughout their height, a low pressure side including an evaporator in heat exchange relation with one of said insulated compartments for the manufacture of ice and for the cooling of air within said compartment, a metallic liner for the other insulated compartment, an evaporator located in direct contact with the exterior surface of three upright side walls of said liner, and a condenser connected to said second named evaporator, said condenser being located in direct contact with a portion of said low pressure side.

J LOWELL GIBSON.